UNITED STATES PATENT OFFICE.

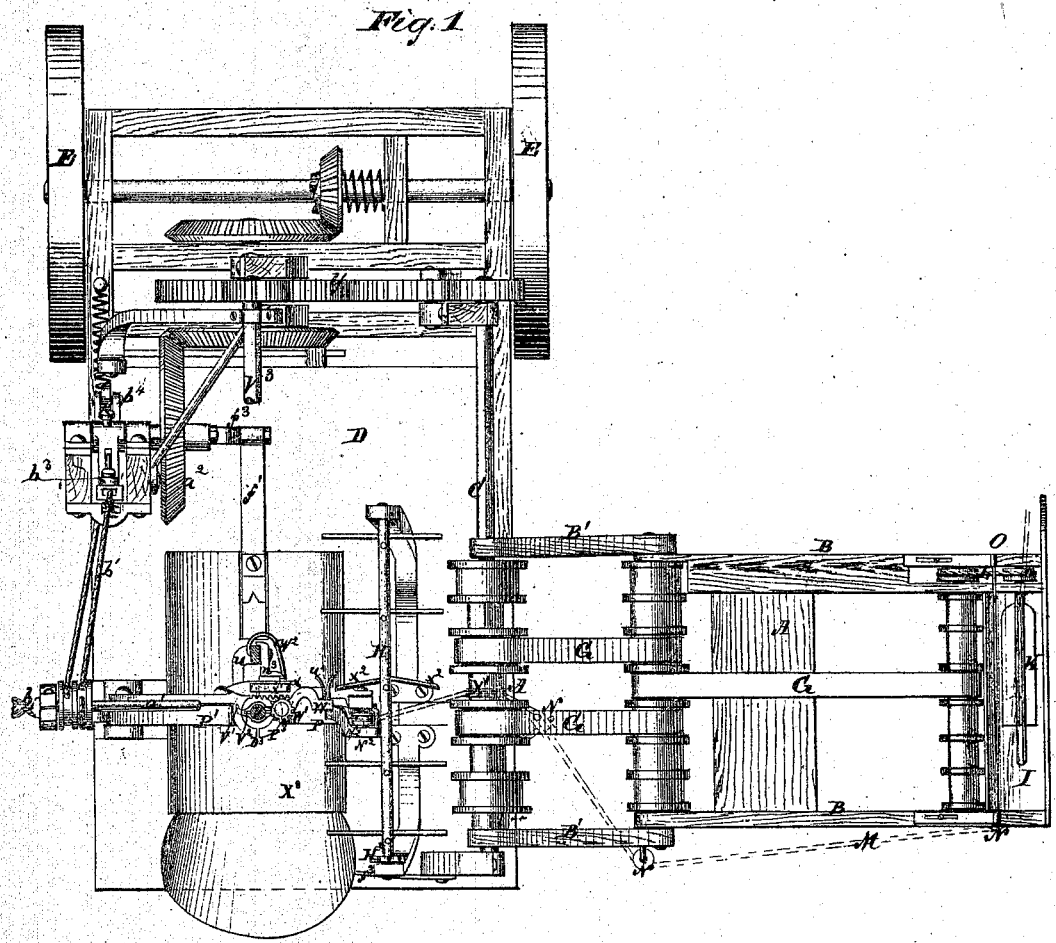

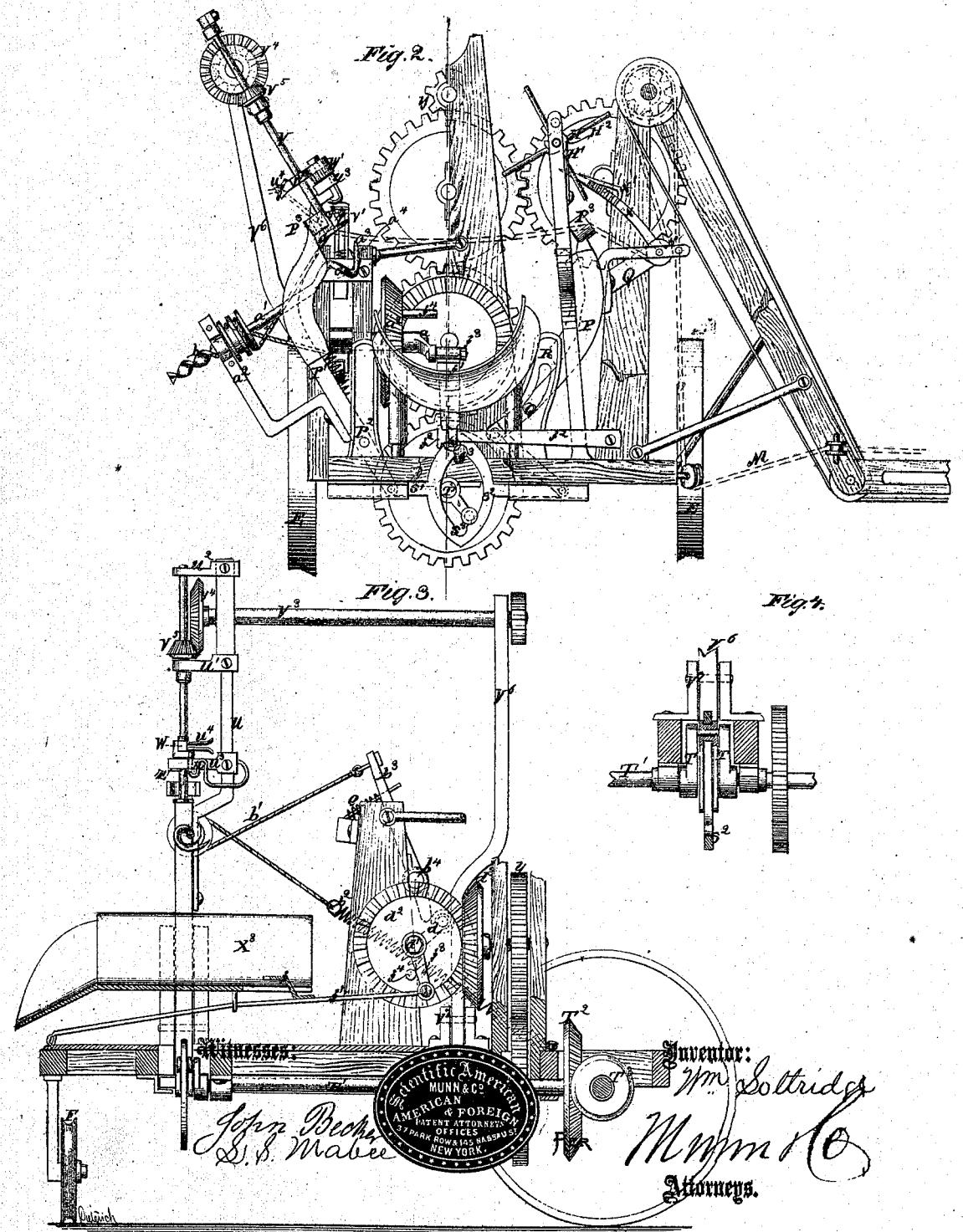

WILLIAM LOTTRIDGE, OF CHARLES CITY, IOWA.

IMPROVEMENT IN GRAIN-BINDERS.

Specification forming part of Letters Patent No. 107,933, dated October 4, 1870.

*To all whom it may concern:*

Be it known that I, WILLIAM LOTTRIDGE, of Charles City, in the county of Floyd and State of Iowa, have invented a new and Improved Grain-Binder; and I do hereby declare that the following is a full, clear, and exact description thereof, which will enable others skilled in the art to make and use the same, reference being had to the accompanying drawings, forming part of this specification.

This invention relates to improvements in grain-binding attachments for reaping-machines, and consists in a twisting attachment to the platform of the harvester, for forming a rope of straw to make the bands, the said rope being conducted over suitable guide-rollers to the feeding apparatus; also, in an arrangement of binding-jaws, twister, tucker, cutter, and the operating devices for the twister for swinging back and forth to open and close over a trough, to which the gavel is delivered by a reel receiving the straw from an endless carrier, the said jaws opening to admit the guard, and disconnect the driving-gear for the twister, and closing to engage the twister with its driving-gear to bind the gavel.

The invention also consists in certain improvements in the construction, arrangement, and operation of the rope-carrier, tucker, discharger, cutters, and the grain-holding and delivering reel, all as hereinafter specified.

Figure 1 represents a plan view of my improved machine. Fig. 2 is an end elevation of the same. Fig. 3 is a sectional elevation, taken on the line $x\ x$ of Fig. 2. Fig. 4 is a sectional detail, showing the devices for opening and closing the jaws.

Similar letters of reference indicate corresponding parts.

A represents the platform of a harvester, upon which the grain is caused to fall by the reel when cut. It is supported by the jointed bars B B', the latter being connected to the shaft C, mounted in suitable elevated supports on the frame D, extending rearward from the wheels of the harvester. The rear end of the frame D is carried on a caster-wheel, F. The shaft C, which gears with a train of gearing connected with the axle of the wheels E, carries endless belts G G', which carry the cut grain up over the said shaft C, and deliver it onto a reel, H, for holding and discharging it at the proper time. I is a trough arranged in the outer end of the platform, and K is a twisting-spindle, mounted in the front beam of the platform, to revolve in the trough. It is operated by a belt, L, working over the outer carrier-belt drum. This spindle has radial blades working in the straw, which falls into the trough, twists it into a rope, M, which is delivered off the free end of the spindle, and passes over the guide-rollers N up to and around the drum X, thence over the pulley $N^2$ to the binding apparatus.

For varying the amount of straw delivered into the trough, an adjustable guard-wire, O, is so placed on the grain-board as to divide the grain and deliver the required amount for the rope into the trough.

P represents one of the binding-jaws, and $P^1$ the other. The former is pivoted, at Q, in a post, R, having a curved slot which allows the pivots or journals Q to rise and fall when the jaw is moved. The lower end of this jaw is connected, by a link, with a bar, $S^1$, below the platform D, and sliding to and fro, transversely thereof. The jaw $P^1$ is pivoted at $P^2$, the pivot being in fixed bearings. The lower end of this jaw is connected to the sliding bar $S^1$. This bar is provided with a yoke, $S^2$, having circular recesses $S^3$ at the junction of the two curved bars constituting the yoke, and the inner edges of the said bars are formed on a curved line of a radius equal to the distance from the wrist-pin of the crank T to the shaft $T^1$, from outside to outside. The yoke is so arranged that the wrist-pin of the crank only moves it when it falls into the recesses $S^3$ at the angle S of the bars, consequently the yokes have two movements and two periods of rest at each revolution of the crank-shaft. This shaft $T^1$ passes along under the frame D from front to rear, and gears, by a wheel, $T^2$, with a pinion, $T^3$, on the axles of the driving-wheels, by which it is revolved to work the jaws. The arrangement of the link with the jaw F and the bar $S^1$ is such that the movement of the slide to the left will force the jaws together, and a movement in the other direction will close them. These jaws terminate at the upper end in semicircular rings $P^3$, which meet when the jaws come together, and form a horizontal ring. The jaw $P^1$ is provided with a vertical extension, $u$, bent outward a suitable distance, and then rising parallel with the vertical axis of the ring $P^3$, and supports, on arms $u^1$ and $u^2$, a spindle, V, in the said axis, carrying at the lower end a twister, consisting of the hooks $V^1$ and radial plates $V^2$. It also supports, on an arm, $u^3$, a band-carrier, $u^4$, consisting of a crotched wire mounted in a revolving arm, W, connected to a pinion, $W^1$, journaled in the end of arm $u^3$. The spindle of the twister is revolved by a shaft, $V^3$, having a wheel, $V^4$, gearing with a pinion, $V^5$, on it. The said shaft is supported on the upright extension $u$ of the jaw $P^1$, and on an arm, $V^6$, pivoted at $V^7$, and connected at the lower end to a slide arranged and operated, the same as the slide $S^1$, by other cranks in the shaft $T^1$, the said arrangement being shown in cross-section, Fig. 4. There is a locking-spring which rises up through a hole in the end of the bearing $u^3$ into a hole in the pinion, to hold it in the position represented in Fig. 2. The rope of straw is passed across the top of the jaws, and engaged with the rope-holder $u^4$, as shown in dotted lines in Fig. 2. The straw is delivered into the arms of the reel H from the carrying-belts, and is retained by them until the opening of the jaws. The reel is held against turning by a spring-pawl, $H^1$, engaging a ratchet, $H^2$, on the shaft of the reel.

The jaw P carries on an arm, Q′, rising from it near the top, a curved bar, X, provided with cogs on one side and arranged to gear with the pinion $W^1$ when the jaws come together to turn the rope-carrier. This bar X also carries a projection, $X^1$, on the upper face, which comes in contact with one of the short arms $X^2$ of the reel H when the jaws are opening, and turns it a quarter of a revolution to deliver the grain held by it into the space between the jaws for binding and onto the rope stretched across the space above the trough $X^3$. The jaws are then moved together, doubling the rope over the gavel and holding it so that each of the hooks $V^1$ of the twister engages one part of the rope and twists the two together. The said twister is set in motion at the time the jaws are brought together by the shaft $V^3$ and its driving-pinion, which are by the same act brought into gear with a pair of gears, Y, at the front end of the frame, which gear with the shaft $T^1$ and have a constant motion. The projection $X^1$ moves under the short fingers when closing without turning the reel. At the same time that the jaws are brought together the rope-holder $u^4$ is released from the locking-spring $W^2$ by the under side of the arm X, which, passing above the spring which is bent up in front of the arm $u^3$ for the purpose, presses it down out of the hole in the pinion. The latter is then set in motion by the arm X, and swings around so that the forked rope-holder comes into the position represented in Fig. 1, and engages the rope previous to the cutting, which is effected by the twister drawing the rope across one of the cutters, $Z^1$, fixed to the end of the arm $u^3$.

$a$ represents the tucker, consisting of the spiral termination of a shaft, $a^1$, mounted in the jaw $P^1$, and a bracket, $a^2$, attached thereto, the end of the said spiral rod being provided with a hook, $a^3$, for first passing under the band below the twist at the junction of the two parts, twisted together to raise it, and with another forked hook, $a^4$, which takes the twist near the end and tucks it under the band. The outer end of this tucker-shaft is twisted or provided with spiral ribs or vanes at $b$, which work through a bearing properly formed on the bracket $a^2$, to cause the tucker to move endwise at the time the hook raises the band to make more room for the twisted part to be tucked under. This tucker-spindle is turned by a cross-band, $b^1$, connected at one end to a retracting-spring, $b^2$, and at the other to an arm, $b^3$, supported on an axis, $b^4$, and projecting at one end into the path of a tappet-arm, $d$, on an axis, $d^1$, having a wheel, $d^2$, gearing with a wheel, $d^3$, connected with the train Y, which is set in motion by the shaft $T^1$, the said arm being arranged so as to come in contact with bar $b^3$ at the proper time to turn the tucker, which is thereby turned until the arm $d$ escape from the lever $b^3$, which is then thrown back by the spring $b^2$ to its normal position, ready for the next operation.

$e$ is a spring against which the arm $b^3$ strikes when it goes back, to ease the shock. $f$ is a discharger attached to a strap or band, $f^1$, connected at one end to a spring, $f^2$, and at the other end to a loose crank, $f^3$, on the axis $d^1$ of the wheel $d^2$, which is carried backward by the pin $f^4$, drawing the discharger and the springs back until the said crank is let free from the pin by passing beyond the line from the end of the spring $f^2$ through the axis $d^1$; then the spring throws the discharger forward against the sheaf and forces it out of the trough.

Having thus described my invention, I claim as new and desire to secure by Letters Patent—

1. The combination of the twisting-spindle, the belt L, and straw-carrier rollers, substantially as specified.

2. The combination, with the twisting-spindle K, of the adjustable straw-guide O, substantially as specified.

3. The tucker $a^4$, provided with the lifting-hook $a^3$, constructed and operating substantially as specified.

4. The combination of the tucker and twister, constructed and operating as specified.

5. The combination, with the rope-holder and its pinion $W^1$, of the spring-holder $W^2$ and rack-bar X, substantially as specified.

6. The combination of the jaws P $P^1$ and reel H and endless carrier, constructed, arranged, and operating substantially as specified.

7. The combination with the reel and turning arms $x^2$ of the arm $x$ and projection $x^1$, substantially as specified.

8. The combination and arrangement of the jaw $P^1$ and extension $u$ thereon, twister-spindle V, shaft $V^3$, arm $V^6$, and gears Y, substantially as specified.

9. The combination, with the tucker-shaft $a^1$, of the cord $b^1$, lever $b^3$, crank D, and spring $b^2$, substantially as specified.

WILLIAM LOTTRIDGE.

Witnesses:
HENRY PRESTON,
ERI PRESTON.